No. 697,709. Patented Apr. 15, 1902.
D. L. FERGUSON.
TOY BOAT.
(Application filed Oct. 19, 1901.)
(No Model.)

Witnesses
H. G. Dieterich
Herbert D. Lawson

Inventor
David L. Ferguson

By Victor J. Evans
Attorney

THE NORRIS PETERS CO., PHOTO-LITHO., WASHINGTON, D. C.

UNITED STATES PATENT OFFICE.

DAVID LEMUEL FERGUSON, OF THARON, NORTH CAROLINA.

TOY BOAT.

SPECIFICATION forming part of Letters Patent No. 697,709, dated April 15, 1902.

Application filed October 19, 1901. Serial No. 79,277. (No model.)

*To all whom it may concern:*

Be it known that I, DAVID LEMUEL FERGUSON, a citizen of the United States, residing at Tharon, in the county of Duplin and State of North Carolina, have invented certain new and useful Improvements in Toy Boats; and I do hereby declare the following to be a full, clear, and exact description of the invention, such as will enable others skilled in the art to which it appertains to make and use the same.

My invention relates to toy boats; and its primary object is to provide a device which is simple in construction, yet effective in operation, adapted to be propelled by a small animal, as a mouse or squirrel.

My invention consists in providing a boat with a cage or house and a rotative wheel or drum arranged so that a mouse may pass from the cage to the wheel without injury.

The invention further consists in providing the rotative wheel with a bevel-pinion adapted to mesh with a similar pinion mounted upon a propeller-shaft, as hereinafter more fully set forth and described, and pointed out in the appended claim.

Figure 1:
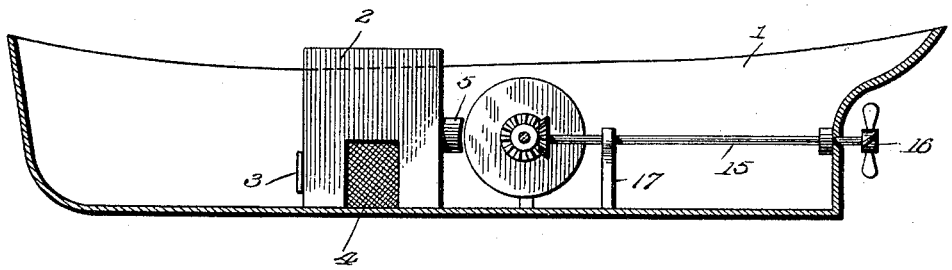
Figure 2:
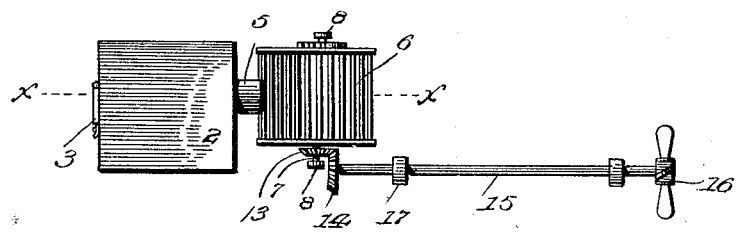
Figure 3:
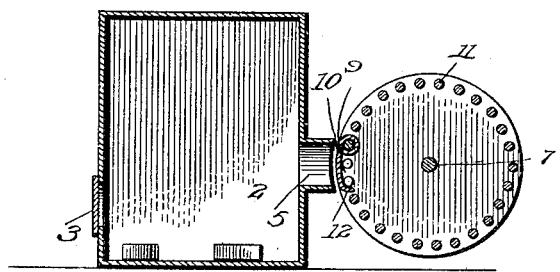
Figure 4:
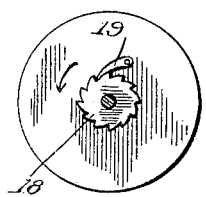

In the accompanying drawings, Figure 1 is a vertical longitudinal section of a boat provided with my improvement. Fig. 2 is a top plan view of my invention removed from the boat. Fig. 3 is a section taken on line *x x* of Fig. 2, and Fig. 4 is an end view of the rotative wheel.

Referring to the drawings by numerals, 1 designates the hull of the boat, within which is arranged a cage or house 2, adapted to receive the mouse or other animal, and is provided with a door 3 and window 4, which may be closed in any desired manner. The rear side of the cage 2 is provided with a hollow extension 5, which forms a passage-way through which the animal passes to enter the rotative wheel or drum 6, located adjacent the said extension 5. The outer end of the extension 5 is curved to conform to the curvature of the drum 6. The rotative wheel 6 is loosely mounted upon a shaft 7, supported in suitable bearings 8. An opening 9 is formed in the periphery of the drum 6 and is provided with a swinging door 10, hinged to one of the transverse bars 11 of the drum. The transverse bars 11 are arranged close together, so as to prevent the animal from escaping. These bars not only serve the purpose of forming the frame of the drum, but also act as treads and enable the mouse to readily rotate the drum. The door 10 is held closed by having its free end hooked, as at 12, which hooked end is adapted to engage one of the adjacent bars 11.

On one end of the shaft 7 is provided a bevel-pinion 13, which meshes with a similar pinion 14, mounted upon the inner end of the propeller-shaft 15.

16 designates the propeller, and 17 a support for the propeller-shaft.

In order that the boat may be propelled evenly and forward only, I mount upon the shaft 7 a fixed ratchet-wheel 18, which is engaged by a pawl 19, pivotally secured upon one of the ends of the rotative drum 6. It will therefore be apparent that when the drum is being rotated in the direction indicated by the arrow the shaft 7 will be rotated. If, however, the mouse turned the drum in the opposite direction, the pawl 19 would not engage the ratchet-wheel 18, and therefore the propeller would not be affected.

The operation of my invention will be readily understood. A mouse or other small animal is placed with the cage or house 2, and when it is desired to start the boat the door 10 of the rotative drum 6 is opened and turned so as to register with the passage-way 5 of the cage, thereby permitting the animal to enter the drum. After this has been accomplished the door 10 is closed, and the animal by climbing upon the treads or transverse bars 11 of the drum will rotate the same, which through the agency of the bevel-pinions 13 and 14 will rotate the propeller 16 and cause the boat to move.

Although I have shown the preferred form of my invention, I reserve the right to make such changes and alterations as fall within the scope of this invention.

Having thus fully described my invention, I claim—

In a device of the character described, the combination with a boat provided with a house for a small animal, of a tread-drum having an opening in its periphery located adjacent the said house, a hollow extension to the said house and having its outer end adjacent the said drum, said outer end being curved to conform to the curvature of the drum, a propeller-shaft having its inner end adjacent the said drum, and means whereby the said shaft and drum will rotate simultaneously.

In testimony whereof I affix my signature in presence of two witnesses.

DAVID LEMUEL FERGUSON.

Witnesses:
HERBERT SMITH,
L. MIDDLETON.